(12) United States Patent
Favero (10) Patent No.: US 9,228,768 B2
(45) Date of Patent: Jan. 5, 2016

(54) METHOD AND APPARATUS FOR DRYING COMPRESSED GASES

(75) Inventor: Chiara Favero, Perarolo di Vigonza (IT)

(73) Assignee: PARKER HANNIFIN MANUFACTURING S.R.L., Corsico (IT)

( * ) Notice: Subject to any disclaimer, the term of this patent is extended or adjusted under 35 U.S.C. 154(b) by 145 days.

(21) Appl. No.: 13/980,738

(22) PCT Filed: Feb. 16, 2012

(86) PCT No.: PCT/EP2012/052661
§ 371 (c)(1),
(2), (4) Date: Jul. 19, 2013

(87) PCT Pub. No.: WO2012/126680
PCT Pub. Date: Sep. 27, 2012

(65) Prior Publication Data
US 2013/0291573 A1 Nov. 7, 2013

(30) Foreign Application Priority Data
Mar. 22, 2011 (IT) .............................. PN2011A0019

(51) Int. Cl.
*F25B 1/00* (2006.01)
*F25B 49/02* (2006.01)
(Continued)

(52) U.S. Cl.
CPC .............. *F25B 49/02* (2013.01); *B01D 53/265* (2013.01); *F24F 3/1405* (2013.01); *B01D 2257/80* (2013.01); *B01D 2258/06* (2013.01)

(58) Field of Classification Search
CPC ................... F24F 2003/144; F24F 2003/1446; F24F 2203/021; F24F 2203/023; F24F 2203/025; F25B 2400/0401; F25B 2600/0251; F25B 49/02; F25B 49/022
See application file for complete search history.

(56) References Cited

U.S. PATENT DOCUMENTS 6,393,850 B1 5/2002 Vanderstraeten
6,516,622 B1 2/2003 Wilson et al.
(Continued)

FOREIGN PATENT DOCUMENTS

EP         1 702 667 A2      9/2006
EP         1702667 A2 *      9/2006
WO    WO 2008/055322 A1      5/2008

OTHER PUBLICATIONS

Written Opinion of the International Searching Authority Issued in Application No. PCT/EP2012/052661; Dated Mar. 26, 2012.
(Continued)

*Primary Examiner* — Frantz Jules
*Assistant Examiner* — Erik Mendoza-Wilkenfel
(74) *Attorney, Agent, or Firm* — Oliff PLC (57) ABSTRACT

A method maintains, in a compressed gas dryer, working through condensation of moisture contained in the air and with dryer thermal load demands, an operation that keeps the temperature of the evaporator, near the outflow of the compressed air, in range between a value sufficiently high to avoid freezing the moisture in the compressed air and a value sufficiently low to avoid compromising the effect of moisture condensation generated by the decreased temperature. This objective is achieved with a compressor by-pass conduit on which is mounted a selectively controllable adjusting valve. The operation includes: measurement of the evaporation temperature (Tev), and verification the temperature is higher than a preset value (Set_Tev); starting the compressor; opening the valve for a preset time, and then closing it; verification that the temperature is higher than a preset value; if the time elapsed is longer than a predetermined time, then the valve is opened.

9 Claims, 6 Drawing Sheets (51) Int. Cl.
  *B01D 53/26* (2006.01)
  *F24F 3/14* (2006.01)

(56) References Cited

U.S. PATENT DOCUMENTS

2004/0098994 A1* 5/2004 Lee .................................. 62/175
2009/0025407 A1* 1/2009 Dalla Valle et al. ............. 62/129
2012/0006525 A1* 1/2012 Lafleur et al. ................. 165/238

OTHER PUBLICATIONS

International Search Report issued in Application No. PCT/EP2012/052661; Dated Mar. 26, 2012.

* cited by examiner

METHOD AND APPARATUS FOR DRYING COMPRESSED GASES

The present invention concerns a method for drying gas, particularly air, typically air compressed in air compressors.

A well-known problem that manufacturers of air compressors must deal with is that caused by the presence of moisture contained in the mass of air used. In fact, the compressed air that leaves the final stage of an air compressor contains a quantity of water in the form of vapour that is prone to condense and favour the formation of rust, or give rise to other problems.

It is therefore useful and often necessary to eliminate as much as possible any such water from the air.

According to the prior art, refrigeration cycle compressed air dryers reduce the water vapour thanks to the condensation of the vapour upon cooling the air. A typical cooling cycle to obtain said vapour condensation is represented symbolically in FIG. 6. The figure shows that the air containing the water vapour to be cooled enters into a an air/air heat exchanger S1 that acts as economizer, and by which it is cooled before entering into a second heat exchanger S2, the other branch of which is crossed by a circulation of a generally intermediate fluid coming from a third heat exchanger S3.

Figure 6:
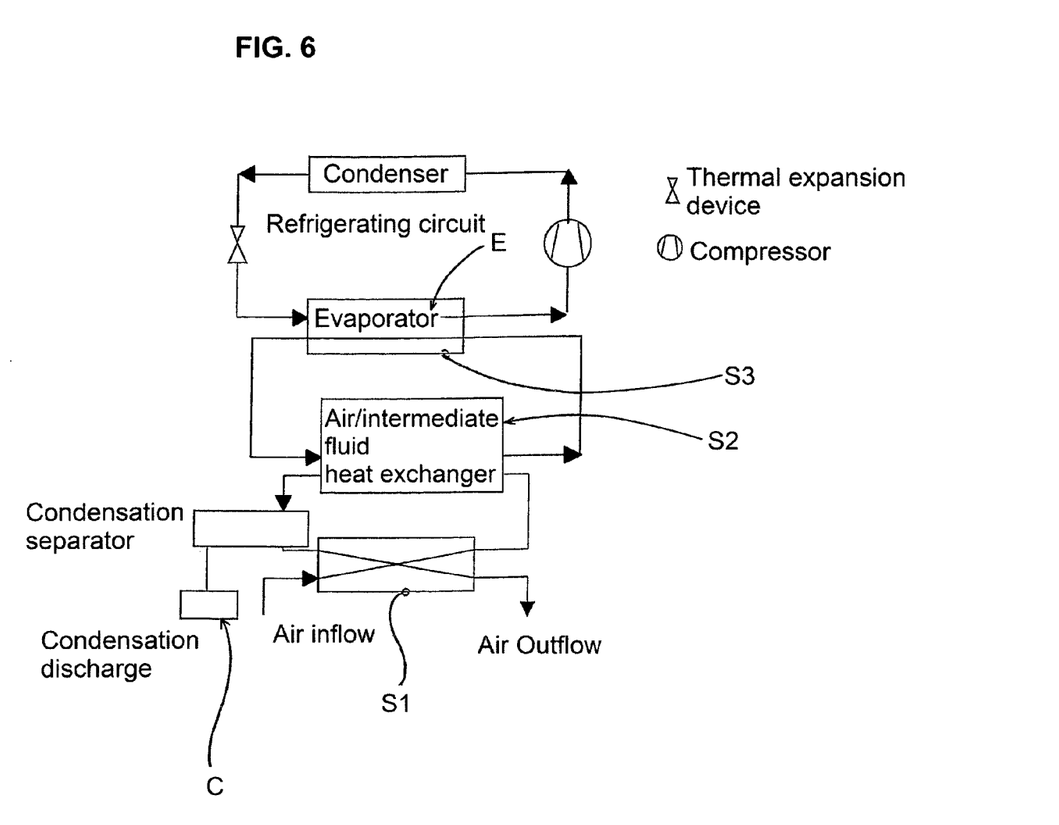
FIG. 6 illustrates a block diagram of a drying system suitable to carry out the method according to the known art.

The cold branch of the third heat exchanger "S3" comprises an evaporator "E" of a refrigerating circuit. In this evaporator is generated the cooling of a refrigerating fluid due to its evaporation, brought about by well-known physical phenomena.

At the exit from the air/air exchanger, the water vapour content remains naturally constant, while, by effect of the temperature increase, its relative humidity decreases.

After the second heat exchanger "S2", and before entering into the first heat exchanger "S1", the compressed air reaches naturally its lowest temperature. At this point, its moisture is almost completely condensed, and its condensation is separated and drained off into a relative condensation discharge device "C".

As is well known, the equipment used to dry compressed air in the field of production of compressed air must meet as much as possible the following requirements:

they must operate with a thermal load that may change (even very rapidly) from 0% to its maximum nominal value, which we indicate as 100%;

the temperature of the air during the drying process must not drop below zero; this is to prevent the condensation from freezing and consequently plugging or damaging the evaporator;

the dew point must be as constant and as low as possible, but above 0° C.;

the absorbed electrical power should be as low as possible, but at the same time variable as a function of the thermal load.

Solutions that address these requirements, that generally conflict with each other, are known in the art.

From U.S. Pat. No. 6,393,850 B1, issued to Atlas Copco Airpower, is known an apparatus and a method for dehumidifying a gas, preferably compressed, by cooling and then condensing it.

This patent starts from the previous state of the art disclosed therein according to which, when the thermal load is very low or almost null, to prevent the compressor (of the refrigerating circuit, obviously) from stopping too often, the same compressor is by-passed by a by-pass conduit that connects the outlet of the compressor to its inlet. In said by-pass duct is also arranged a flow regulating valve, not controllable, calibrated and designed so as to open the relative by-pass duct only after the pressure from the compressor inlet side falls below a predetermined level (this condition occurs with very low thermal loads, so that there is no appreciable heating of the heat exchanger upstream of the condensation separator, and thus the temperature of the fluid that is downstream of said heat exchanger, and that enters into the compressor inlet, remains relatively low, which as a consequence also causes the maintenance of a very low pressure, compared to the normal values at full load).

The calibration or operating value of said valve is such that, in normal conditions of operation, it remains constantly closed, while it is opened in conditions of reduced load, so as to avoid an excessive cooling and therefore an icing-up of the evaporator, caused by the fact that the evaporator lacks an adequate thermal load.

However, this solution causes the problem that, even with a minimal thermal load or none at all, the compressor would continue to operate, but the refrigerating fluid would still be continually by-passed by said flow regulating valve.

This condition evidently conflicts with the basic requirement that the apparatus must absorb the minimum amount of energy, and in any case it is highly preferable that the energy absorbed be fairly well correlated with the service effectively provided and usable.

The solution proposed in said U.S. Pat. No. 6,393,850 B1 consists essentially in the adoption:

in succession to the first by-pass circuit flow regulating valve, of a second shut-off valve, whose operation can thus be controlled through external command and control means;

of a sequence of alternating ON-OFF compressor states;

and of a variable-frequency operation of the same compressor, so as to improve the adaptation of the operating conditions of the apparatus to thermal loads that may vary unpredictably between the two extremes.

Although this solution doubtlessly improves the general performance of the dryer, it still has the following further drawbacks that are serious shortcomings at the industrial and operating level:

firstly, although the ON-OFF switching frequency of the compressor is certainly smaller compared to the previous situation, this fact still does not guarantee that the time interval from one switch-off to the next switch-on remains higher than a level usually preset (by the compressor manufacturer), for reasons that are well known in the art;

moreover, the control of the compressor also by controlling the rotation frequency, and not only in the ON-OFF states, requires compressors with different and more costly characteristics, as well as command and control devices that measure with suitable sensors the general conditions of operation of the dryer, process their signals and send the relative commands to said compressor, adjusting in a continuous mode both its speed and its ON-OFF state, in addition to said second shut-off valve.

It is evident that such greater construction and operating complexity conflicts with the basic requirement of providing a dryer that is fully competitive both in terms of cost and operation.

Patent EP 1 702 667 A2 discloses an embodiment of a dryer for compressed air that presents a physical configuration that is entirely similar to, but completely different in the manner of operation from the dryer described above in U.S. Pat. No. 6,393,850.

In fact, this Patent EP 1 702 667 A2 discloses the solution that, in normal conditions, that is with a thermal load about 50% of the nominal load, after the compressor has been switched off, the temperature controlled at the exit from the evaporator increases rapidly, due to the small thermal mass available.

Thus, to prevent an excessive temperature increase (which would compromise the subsequent cooling and therefore dehumidification phases), the compressor is switched on when only a brief period has elapsed after being switched off. This obviously causes a rapid temperature decrease. To prevent this temperature from dripping excessively, a solenoid valve is opened on the compressor by-pass circuit, and this valve (called warm gas valve) is kept open for a time sufficient to operate the compressor for a minimum preset time since the last switch-off, in the order of a few minutes, typically from 5 to 10 minutes.

However, it was found that, due to this solution, there remains the drawback that, before the compressor is switched off, the temperature of the evaporator would tend to increase again, even with the compressor in operation, exactly because the warm gas valve is in the meantime kept open, and therefore there is effectively a smaller quantity of refrigerating fluid flowing through the evaporator.

As a consequence of this situation, the temperature in the evaporator increases, and this conflicts with the necessity of keeping its temperature at a value slightly higher than the dew temperature (of the compressed air, naturally), and therefore, ideally, with minimum swings or fluctuations.

Thus, one main objective of the present invention is to realize a method and an associated apparatus suitable to dry a flow of air, particularly compressed air, apt to eliminate or at least significantly reduce the drawbacks described above.

Such a method and apparatus must be achievable with materials and technologies that are freely available and competitive, and ensure a sure and adequately feasible result.

This and other objectives are accomplished by a method and an apparatus achieved and operating according to the enclosed claims.

Characteristics and advantages of the invention will become evident from the description which follows, given by way of non-limiting example, with reference to the enclosed drawings, wherein.

Although, the present invention refers specifically to a method, for a clearer explanation reference will be made to a cooling and drying circuit in which said method can be implemented.

Furthermore, for the sole purpose of providing a simpler and clearer understanding of the invention, in the following description it will be assumed that the temperature controlled and regulated in the course of the process is the temperature of a point of the evaporator near the compressed air outflow. However, the control parameter or quantity can also be another physical quantity, such as a temperature correlated with the same, for example, the outflow temperature of the compressed air from the evaporator or the evaporation pressure of the refrigerating fluid, as all these quantities are correlated with the dew point.

The objective of the present invention is therefore to maintain, with any thermal load required of the dryer, a type of operation of the same that holds the preset reference quantity, which in this case is the temperature of the evaporator near the compressed air outflow (but not necessarily that quantity, as was just explained above) included between a value sufficiently high to avoid the risk of freezing the moisture contained in the compressed air and a value sufficiently low to avoid compromising the effect of condensation of the moisture, generated in fact by the decreasing temperature.

Figure 1:
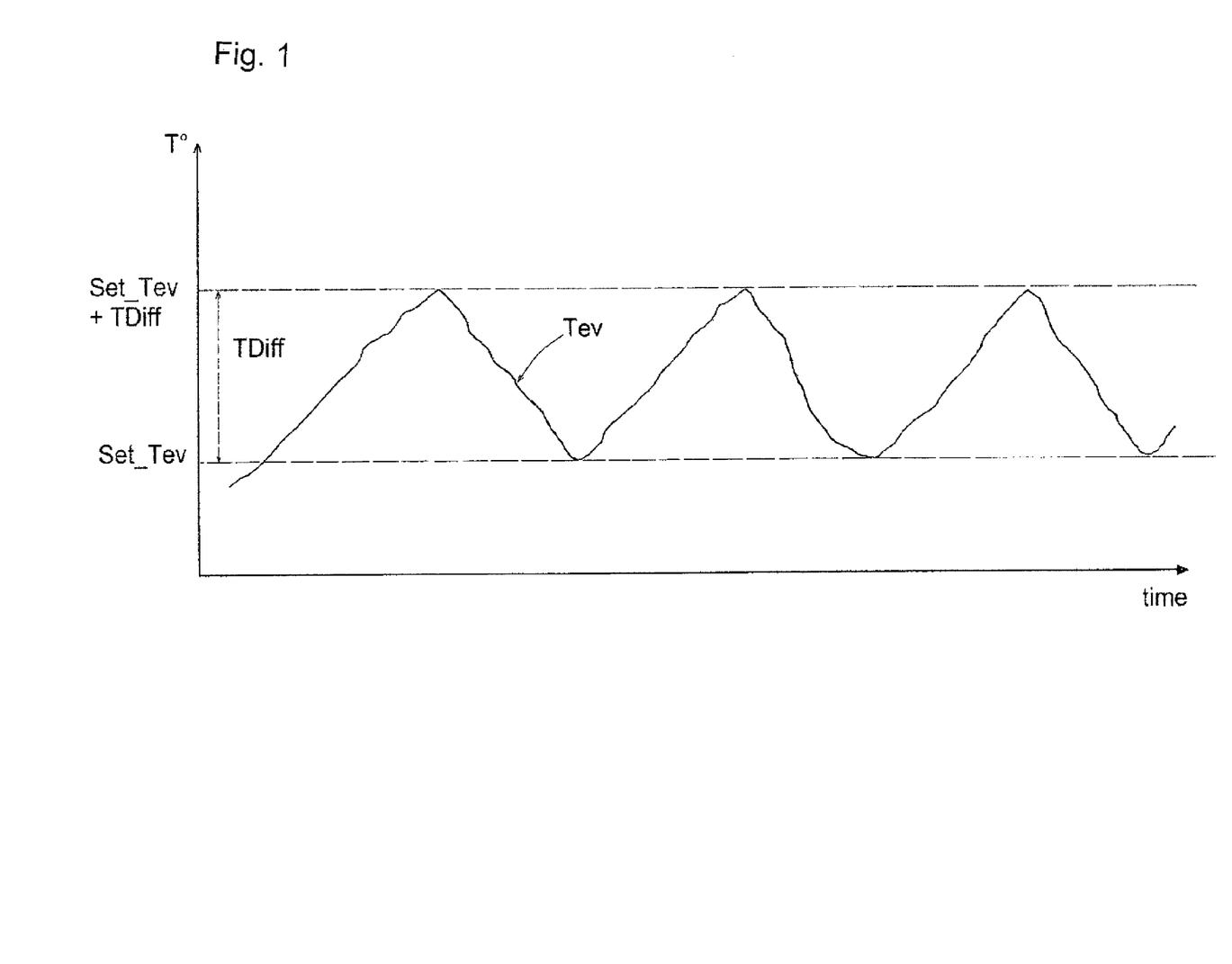
FIG. 1 illustrates a symbolic and simplified graph of the optimal theoretical temperature fluctuation of a dryer according to the invention.

To briefly delineate the above objective, FIG. 1 illustrates symbolically the temperature trend set and obtained in the evaporator according to the method; it can be seen that, based on the time elapsed, the controlled temperature, defined Tev, must vary between a minimum Set_Tev value and a maximum Set_Tev+TDiff value.

Assuming the condition: Tev<Set_Tev+TDiff:

This condition evidently guarantees that the temperature measured is kept lower than the maximum preset temperature Set_Tev+TDiff, and that therefore the request to switch on the compressor comes only after the temperature has risen too high.

In effect, the controlled temperature Tev is allowed to exceed such values upward or downward, but such overruns must be limited and they must immediately generate a change in the operation of the dryer such as to quickly bring the temperature back within said two values.

And, as said above, this condition must be guaranteed with any thermal load.

One of the advantages of this solution lies, therefore, in the fact that, with very low thermal loads, the compressor can also be switched off, and this guarantees a significant energy saving.

Figure 2:
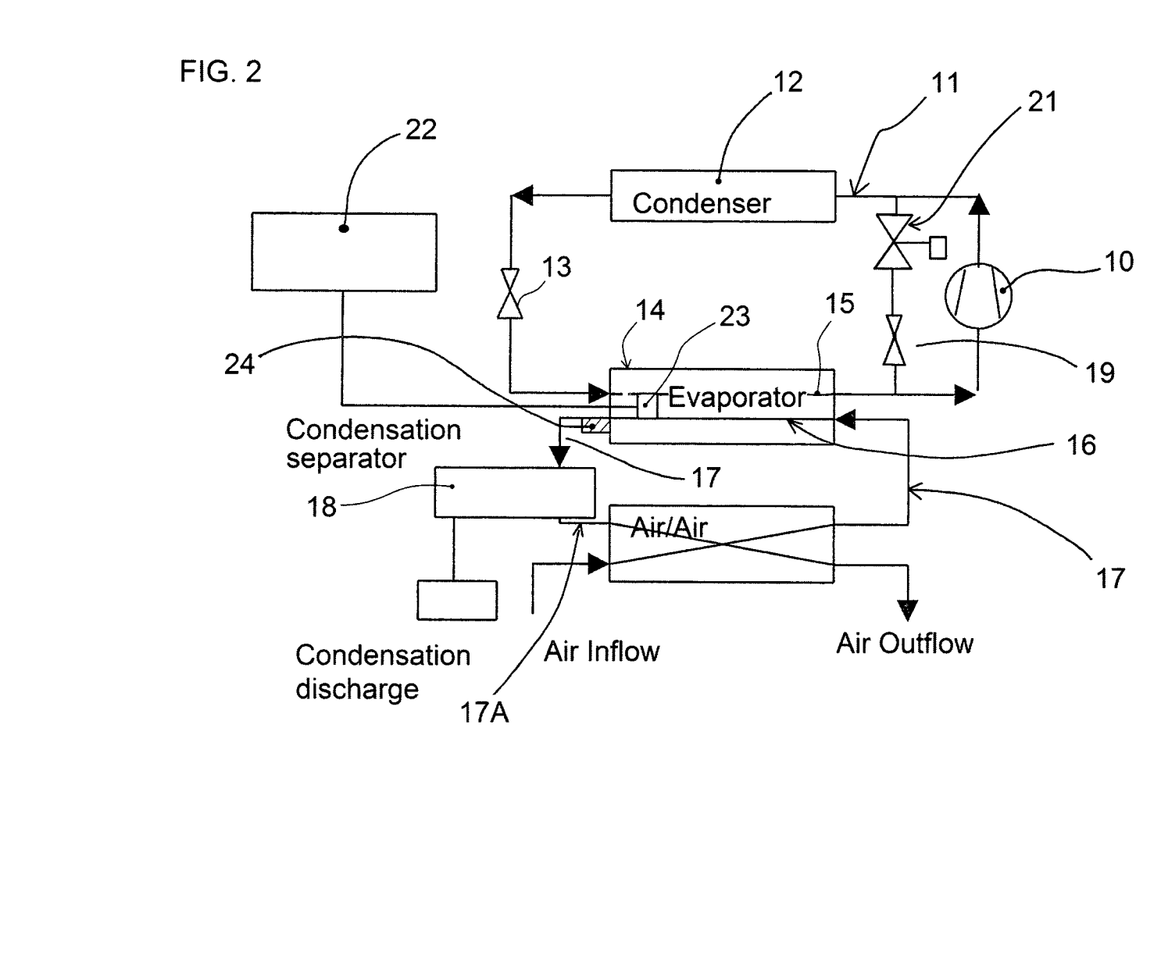
FIG. 2 illustrates a block diagram of a drying system suitable to carry out the method according to the invention.

With reference to FIG. 2, a circuit suitable to carry out the process comprises:

a refrigerating gas compressor 10 suitable to circulate said gas in a first conduit 11;

a first heat exchanger 12 connected to said first conduit 11 downstream of said first compressor 10 and working as a condenser for said refrigerating gas;

an expansion device 13 connected to said first conduit 11 downstream of said first heat exchanger 12;

a second heat exchanger 14, the first branch 15 of which, which works as an evaporator, is connected to said first conduit 11 downstream of said thermal expansion device 13, and the second branch 16 of which is connected to a respective second conduit 17 wherein flows the gas to be dried;

a condensation separator and a relative discharge device 18 connected to the portion 17-A of said second conduit 17 downstream of said second branch 16;

a first fixed calibration valve 19 provided in a respective by-pass circuit 20 of said compressor, said by-pass circuit 20 being connected at its ends to said first conduit 10, respectively in the outflow and inflow sections of said compressor;

a second control valve 21, provided in series in said by-pass circuit 20 and suitable to be operated by external command and control means 22;

a temperature sensor 23 suitable to measure the temperature near an outflow point from said second branch 16 of the gas to be dried, and thus in said second conduit 17; wherein said command and control means are also suitable to:

detect and process the information received from said sensor 23;

control selectively the ON and OFF states of the compressor 10.

Figure 3:
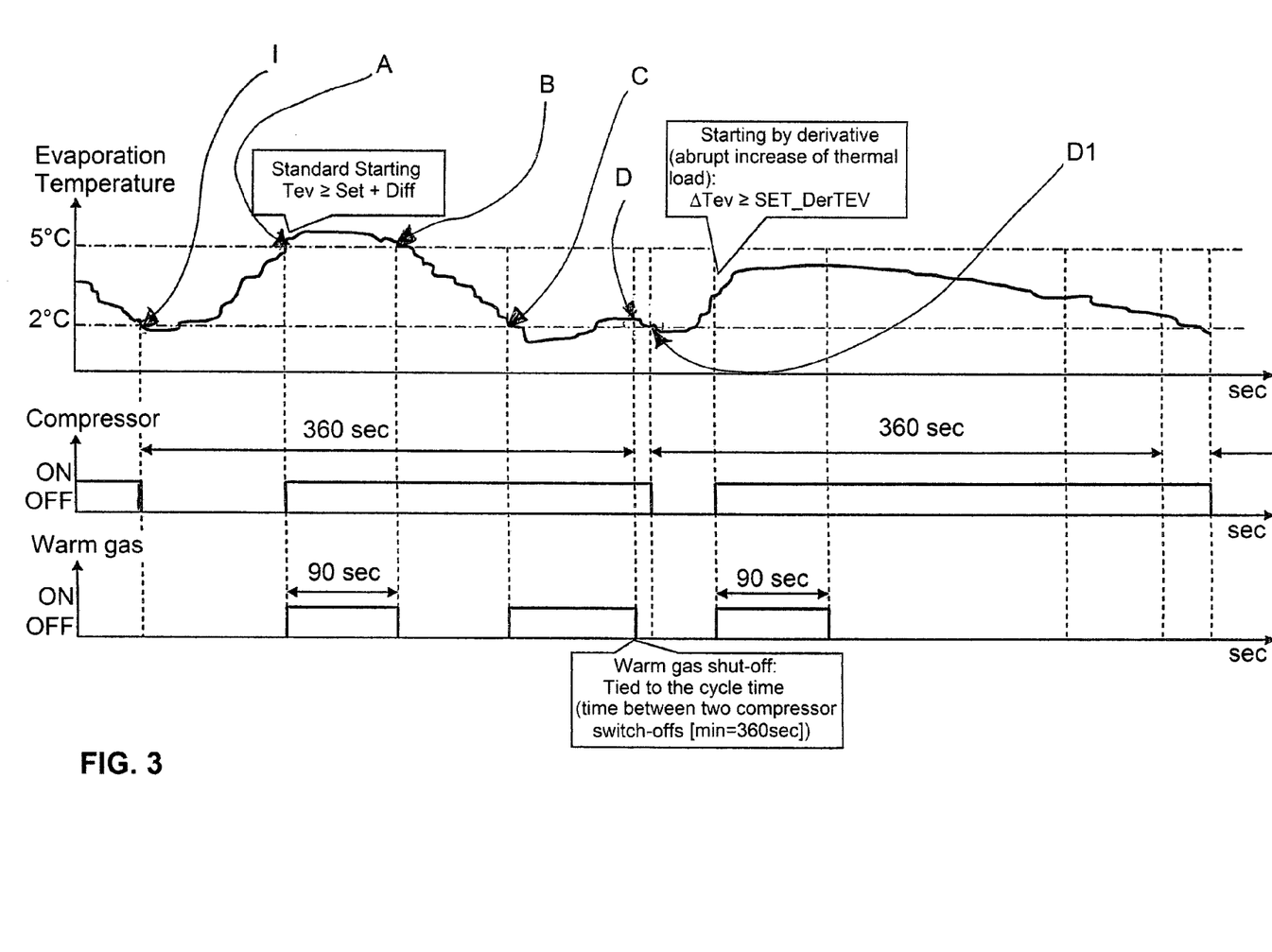
FIG. 3 illustrates the effective temperature trend in an evaporator of a dryer according to the method of the invention.

Referring now to FIG. 3, a curve in the upper part traces a graph of the temperature trend measured by said temperature sensor 23 in a general period of operation according to the method of the invention.

Said graph is accompanied by two other graphs: the intermediate graph shows the ON and OFF states of the compressor; the lower graph shows the ON states (valve 21 open) and the OFF states (the same valve closed).

Said three separate graphs are synchronized with each other, meaning that evidently they represent the respective quantities detected (the temperature of the sensor 23) or the controlled operating states, existing simultaneously and for the entire duration of said period of execution of the process of the invention.

It is assumed here that the process starting moment is identified by point "I" of the temperature graph (upper part).

Figure 4:
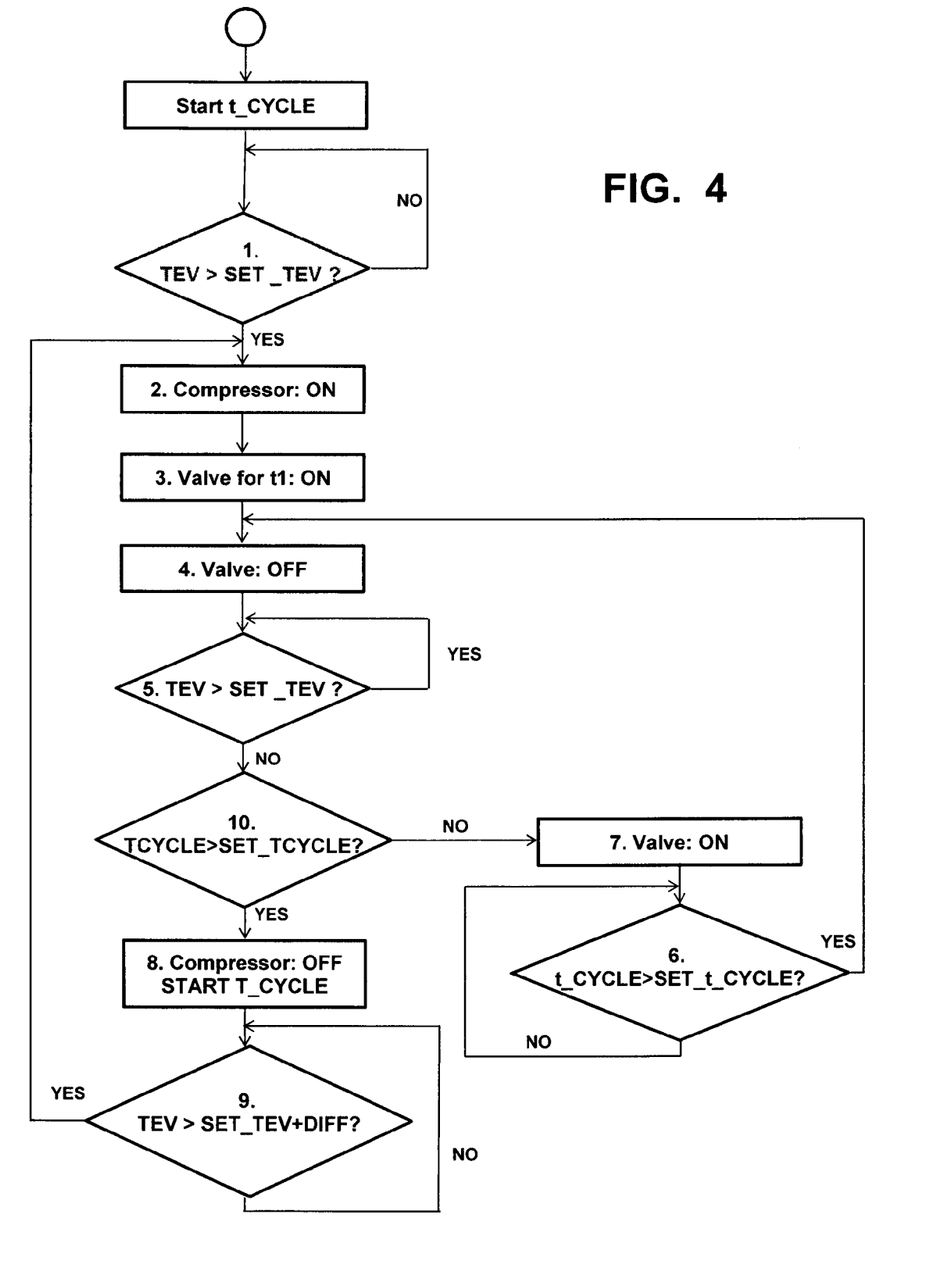
FIG. 4 illustrates a flow chart showing the sequence of the various operations and algorithms according to a first mode of the method of the invention.

The process consists of the following operations, in the ordered sequence in which they are expressed:

1) Measurement Step a) determination and recording of the process starting moment (To), indicated in the "START_CYCLE" block in FIG. 4. Said starting moment:

is not explicitly shown in the graph of FIG. 3, which instead illustrates a typical behaviour in normal steady-state operation;

but it is recorded by a suitable storage means, of known type, that in addition to said instant also records the normal passage of time and therefore automatically the time elapsed with every subsequent instant with respect to said starting moment "I".

b) measurement of the evaporation temperature (Tev); as mentioned above, this temperature is measured by the sensor 23, and the relative information is sent to said command and control means (Block 1).

c) verification that said evaporation temperature (Tev) is higher than a preset value Set_Tev; this implies that said command and control means are provided with a memory such as to receive and store an information correlated with said predetermined temperature Set_Tev, and can be operated so as to:

c1) compare said two values, corresponding to the detected temperature and the stored temperature;

c2) process the result of this comparison, and if the temperature of the Tev sensor 23 is lower than the Set_Tev temperature (naturally, the respective representative quantities can be similarly compared), then this measurement and comparison needs to be continued iteratively.

An important condition needs to be pointed out here: the previous method has been defined with reference to the first switching on of the apparatus, that is, when it is naturally at ambient temperature and therefore relatively "warm" compared with the temperature at which the moisture present in the compressed air is to be condensed.

And thus, in such a starting condition it is sufficient for said temperature to be only slightly higher than the temperature of the lower limit Set_Tev (see FIG. 1) to activate the compressor and achieve an accelerated cooling step (similar to the "pull-down" in freezers).

In effect, said starting step serves to bring the temperature toward its lower limit Set_Tev so as enable the desired moisture condensation.

When, on the other hand, the operation is in a steady state, it will be sufficient to hold the Tev temperature within the range of $$Set\_Tev - Set\_Tev + TDiff$$

(being TDiff a suitable and preset positive value) as shown in FIG. 1.

However, this condition will be better explained later.

On the other hand, if the temperature of the Tev sensor 23 has reached, or exceeded said Set_Tev temperature (see point A), then the following commands will be processed and transmitted:

d) starting the compressor, Block 2: ON;

e) opening of said second control valve 21 for a preset period (T1), Block 3;

f) and subsequent shut-off of said second valve 21, Block 4.

The purpose of these operations is both:

to activate the compressor to lower the temperature, and to limit, after a certain brief period, the temperature drop by also operating and opening the second valve 21; the purpose of this operation is to stabilize the operation of the apparatus, and therefore the process.

In fact, when the compressor is switched on there is an abrupt reduction of the Tev that does not correspond to an effective drop in the refrigerating demand.

And thus the control valve 21 is closed automatically only after the preset time T1 (in the graph, at point "B").

2) Control Step g) measurement of the evaporation temperature (Tev), Block 5;

h) verification that said evaporation temperature (Tev) is lower than said preset value (Set_Tev).

This check serves to verify that the controlled Tev temperature remains at a value higher then the minimum set temperature Set_Tev, even after the closing of the second valve 21, so as to avoid the risk of icing-up (section between points "B" and "C" in the graph of FIG. 3), and for as long as this condition remains.

In fact, this check is carried out iteratively (at a predefined and suitable frequency, not specified here) until the result of such check changes (NO condition).

In fact, when the Tev temperature drops to the Set_Tev value, it means that there is no more need of any further refrigerating capacity at the evaporator (to avoid the risk of icing-up), and thus that, in theory, the compressor can be stopped.

But here rises the problem that needs to be avoided. In fact, it is well known that, for constructive and functional reasons, the compressor cannot be switched off before a definite (minimum) time has elapsed, and that it cannot be switched on before a period defined as "minimum time" has elapsed since the last start-up.

The operation of the compressor should thus be continued, but this conflicts with the necessity to avoid lowering excessively the measured temperature.

Moreover, this can be done only after the required and preset time has elapsed between one switch-off of the compressor and the next, and thus it becomes necessary to also verify what happens with regard to time.

To resolve this problem, the following solution is adopted, which is the essence of the invention:

i) Thus, the time elapsed from the start of the process (To) is also measured, and the consequent comparison is made that the time elapsed from said start moment (To) is shorter than a preset time (Set_Tcycle), Block 10.

k) Therefore, if it is not true that To>Set_Tcycle, in other words that the time elapsed is not yet sufficient, then the second valve 21 is opened (Block 7) to enable the compressor to continue to operate, but substantially "without load", in the sense that its refrigerating fluid is partly made to circulate in the by-pass circuit 20, and therefore without making it again flow through the evaporator, which is already sufficiently cold.

l) Next, the time To from the start of the process is measured and compared (Block 6); if it is not true that Tcycle>Set_Tcycle, that is, that the moment of the present measurement precedes the final waiting moment for the predefined Set_Tcycle period, (Condition: NO), then this measurement and comparison is carried out iteratively, until Tcycle>SetTcycle is effectively true.

In this case, which means that the predetermined SetTcycle time has been reached, and the algorithm is returned to the condition of the previous operation f), so that the valve 21 is shut off (Block 4).

3) Continuation Step

From this condition on, the process continues as after said operation f) until, returning to Block 5 and to the subsequent Block 10, the condition TCycle>Set_Tcycle is effectively true.

In practice, this means that the minimum preset time has elapsed between two successive switching-off operations of the compressor.

Thus the conditions necessary and sufficient to switch off the compressor are now verified.

m) When this Tev temperature has dropped sufficiently as far as reaching the Set_Tev, the compressor is stopped (Block 8).

The temperature then starts spontaneously to rise back up, and thus the exact operating conditions seen in the above step c) are determined and repeated.

The compressor remains off until Tev>Set_Tev+TDiff.

From this moment on, the conditions present in step c) above take place, and specifically it is checked if the condition Tev>Set_Tev+TDiff is true.

n) If this condition is true (as shown in Block 9), in other words, if that temperature value Tev>Set_Tev+TDiff is reached (as illustrated in Block 9), then the process continues according to the previous step d), that is, from Block 2, and thus the operation of the compressor is started (ON).

4) Advanced Control Step

Figure 5:
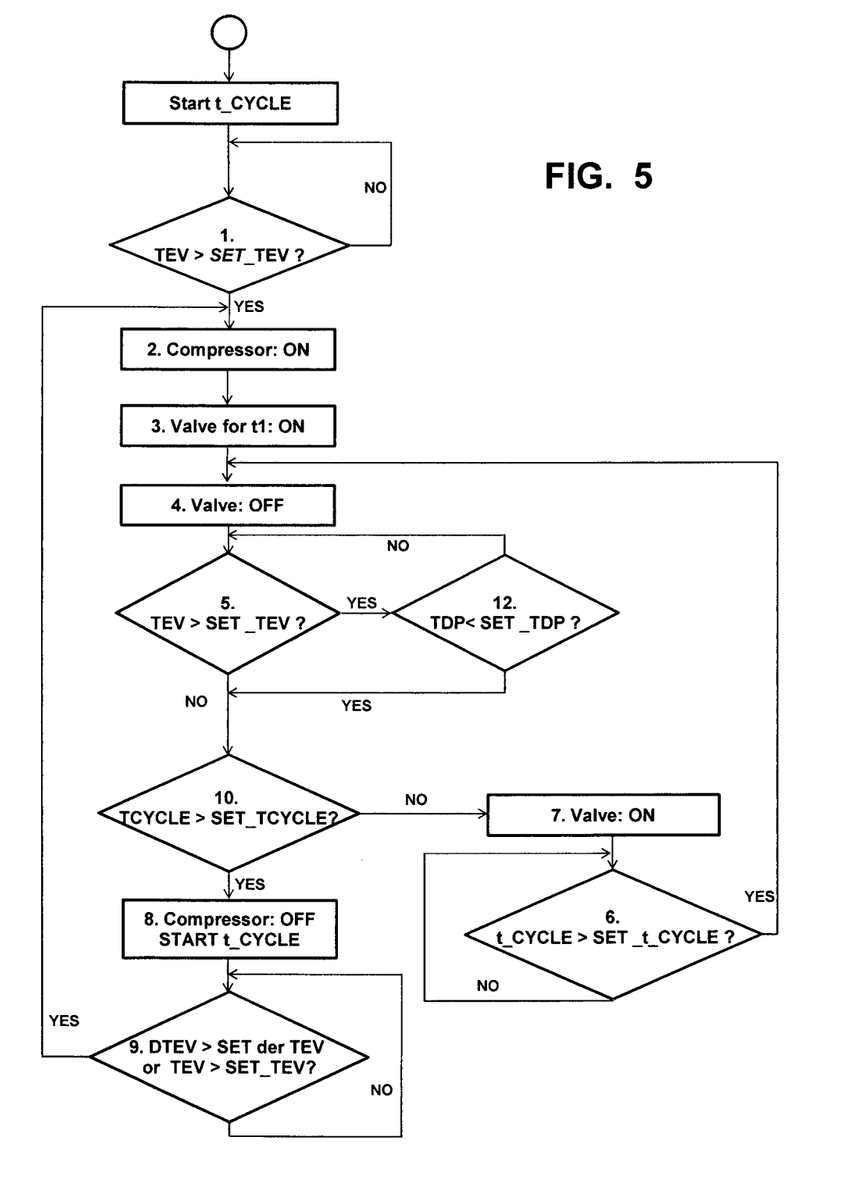
FIG. 5 illustrates a flow chart showing the sequence of the various operations and algorithms according to an improved mode of the method of the invention.

With reference to the flow chart of FIG. 5, an advantageous improvement of the method of the invention consists of the fact of also including, in the temperature conditions that give rise to the sequence of the various operations described, the condition that:

the derivative of the measured Tev temperature is higher than a preset value SET_DerTev, that is, D_Tev>SET_DTev.

In fact, if the rate of temperature increase is too high, as would be the case if the condition just described is true, then quite evidently this signals in advance the rapid attainment of the maximum acceptable temperature; thus it is advisable to immediately start the compressor so as to anticipate and/or prevent any very probable excessive temperature increases.

It is also evident that this condition must be advantageously verified in the same previous step n), during which are thus verified, with the "OR" logic on one, or both the following conditions are established as true:

Tev>Set_Tev+TDiff or:
D_Tev>SET_DTev.

If therefore either of the two previous conditions is true, the condition explained in the previous step n) is repeated, and the process thus improved continues according to the previous step d), that is, from Block 2, and thus by switching on the compressor (ON).

In fact, this condition represents the case in which under normal running conditions (and not in the starting conditions seen in the previous step c2), the temperature of the evaporator, although still rather low (the compressor has been off for a short time), is still lower than the preset temperature Set_Tev+TDiff, which represents that particular value that is not to be exceeded, because otherwise such excessive rise in temperature would compromise the efficiency of the compressed gas cooling process, and therefore the possibility of effectively condensing the moisture present in it.

In practice, in this manner it is ensured that the range of temperatures within which the Tev temperature must vary is the range:

Set_Tev→TSet_Tev+TDiff, which is one of the basic objectives of the invention.

It is again pointed out that the previous operations are carried out during the period included between point "I" and "A" of the graph of FIG. 3, that is, in conditions of normal operation.

With reference to FIG. 5, the following improvement is particularly advantageous: in Block 5 is ascertained the following condition:

Tev>Set_Tev.

If this condition is real, it means that the temperature is still fairly high, and that therefore it is necessary to continue to maintain the compressor in operation.

However, there could be the situation that, even if said temperature is still high, a temperature sensed on the compressed air conduit at the exit from the evaporator 14 is still rather low, in a measure that is more than sufficient to produce the required condensation of the moisture in the relative conduit.

It was seen that this condition occurs particularly evidently when the thermal load required is considerably lowered, or is even zeroed out, in which case there is no more need to maintain the compressor in operation, save for the requirement of keeping it in operation for the minimum predefined time Tcycle.

Thus, in step h), at Block 5, is defined an "IF" operation.
If in fact it is not true that Tev>Set_Tev, then evidently the process returns to the previous step h), from which it proceeds as described.
If instead it is true that Tev>Set_Tev, then the process goes on with a supplementary step s) at Block 12.

In that step s) it is verified that a Set_Tdp temperature value (temperature of Dew Point) is set, and if it is found that in a definite position of the air conduit in the heat exchanger 14, and in particular at the outflow from the same heat exchanger, the relative Tdp temperature, measured by a suitable dedicated sensor 24, is lower than that Set_Tdp value, Tdp<Set_Tdv, then the previously described condition is confirmed, that is,
the temperature of the air is already sufficiently low, independently of the temperature of the refrigerating fluid Tev.
In this case, the process by-passes step h) and progresses directly to step i) (Block 10), from where it proceeds as described.

A further improvement is as follows: with reference to FIG. 2, and for the purpose of improving the energy efficiency of the process and of the apparatus suitable to carry out said process, the compressed air to be dehumidified, before entering into the heat exchanger 14, is made to flow through an economizer means 30 consisting substantially of a third air/air heat exchanger.

As can be seen in said FIG. 2, the air that flows in the conduit 17, before entering into the heat exchanger 14 is made to flow through said third heat exchanger 30, in which there is also the passage of the cooled and dehumidified air in said portion 17-A of said second conduit 17 downstream of said second branch 16, and coming from the second heat exchanger 14.

In practice, using a known art, the air to be cooled and dehumidified is pre-cooled to improve the overall energy efficiency, and this pre-cooling is obtained substantially at no cost, since the amount of heat extracted is drawn, through said third heat exchanger 30, from the air flow, still very refrigerated, that flows from the second heat exchanger 14.

For what concerns the functions generally defined as "command and control" functions, in other words the determination of the temperature on the basis of the signals from the sensors 23 and 24, the comparison of the various levels with the corresponding preset values, the processing of the results of said comparisons, the transmission of the relative signals and the relative commands to the second valve and to the compressor, these are in themselves well-known in the art and immediately adaptable and applicable without any particular difficulty to the present process; therefore these functions, as they are not part of the invention, are not explained further.

These functions are symbolically collected in a command and control unit 22 to which are connected said two sensors 23 and 24, said second valve 21 and said compressor 10.

The invention claimed is:

1. Method for gas drying, particularly of a compressed gas, comprising the steps of:
    introducing the gas to be dried into a second conduit which includes a condensation separator which is arranged in a second branch of a second heat exchanger having a respective first branch including an evaporator, the first branch forming a portion of a cooling circuit circulating a cooling fluid means and obtained by a first conduit, said evaporator, a compressor and a by-pass conduit capable of connecting the suction side to the output side of said compressor, said by-pass conduit comprising a fixed valve and a second control valve capable of being selectively closed or opened, and command and control means configured to:
    selectively command the closure or opening of said second control valve, and
    selectively command the stop and the start of said compressor, so that said cooling fluid means flowing out from said compressor is selectively directed with said second control valve open across said by-pass circuit and back to the suction side of said compressor, or the cooling fluid means is fully directed with said second control valve closed into said first conduit according to the commands processed and sent by said command and control means,
    define a minimum time interval length between two successive compressor starts, wherein the method includes the following steps:
    defining and recording a time moment of the method starting,
    measuring the evaporation temperature, or a different but correlated quantity,
    verifying said measured evaporation temperature or said different but correlated quantity is higher than a first pre-defined temperature or correlated quantity by comparing said measured evaporation temperature or correlated quantity and said first pre-defined temperature or correlated quantity, and when said measured evaporation temperature or the correlated quantity is higher than said first pre-defined temperature, or correlated quantity, then starting said compressor, and opening said second valve for a pre-defined time length; and thereafter closing said second valve,
    measuring the evaporation temperature or the different but correlated quantity,
    checking that said measured evaporation temperature or the correlated quantity is not higher than a second pre-defined temperature or correlated quantity,
    measuring the time length from the method beginning, and subsequently checking whether the condition that the time length passed from said method beginning is higher than said minimum time interval length.

2. Method according to claim 1, wherein:
    when from said checking the time length passed from the method beginning is not higher than said minimum time interval length, then opening the second valve, and
    when from said checking the time length passed from the method beginning is higher than said minimum time interval length repeating the method in a continuous way.

3. Method according to claim 1, wherein, when from said checking the time length passed from the method beginning is higher than said minimum time interval length, continuing the method from said step of closing said second valve.

4. Method according to claim 1, wherein, when the measured time length from the beginning is greater than said minimum time interval length:
    stopping compressor,
    resetting a time moment of the method starting,
    measuring the evaporation temperature,
    measuring and computing the time-derivative of said evaporation temperature in the time interval ending when said evaporation temperature reaches said first pre-defined temperature.

5. Method according to claim 4, wherein, when either of the following conditions is met:
    said measured evaporation temperature or correlated quantity is higher than said first pre-defined temperature or correlated quantity,
    or
    said time-derivative of said evaporation temperature is higher than a specified and predefined level,
    then continuing the method according to the previous step of starting said compressor.

6. Method according to claim 1, wherein, if the measured evaporation temperature, or the different but correlated quantity, is higher than said pre-defined temperature or correlated quantity,
    and if it is found that, in a definite position of said second conduit on said second heat exchanger, the respective temperature is lower than a pre-defined specific temperature, then the method continues according to the step of measuring the time length from the beginning.

7. Method according to claim 1, wherein the gas to be dried, before passing across said second heat exchanger, is directed and passes across a third heat exchanger to which is also directed the cooled and dried gas in the portion of said second conduit downstream the respective said second branch.

8. Method according to claim 1, wherein a different but correlated quantity to the evaporation temperature is measured in said measuring and compared with a first pre-defined correlated quantity in said comparing.

9. Apparatus for drying gas comprising:
    a second conduit into which a gas to be dried can be introduced, the second conduit including a condensation separator arranged in a second branch of a second heat exchanger having a respective first brunch including an evaporator, the first branch forming a portion of a cooling circuit circulating a cooling fluid means and obtained by a first conduit, said evaporator, a compressor and a by-pass conduit capable of connecting the suction side to the output side of said compressor, said by-pass conduit comprising a fixed valve and a second control valve capable of being selectively closed or opened, and command and control means configured to:

selectively command the closure of opening of said second control valve, selectively command the stop and the start of said compressor, so that said cooling fluid means flowing out from said compressor is selectively directed across said by-pass circuit and back to the suction side of said compressor, or the cooling fluid means is fully directed into said first conduit according to the commands processed and send by said command and control means, define a minimum time interval length between two successive compressor starts, define and record a time moment of starting gas drying with the apparatus, measure the evaporation temperature, or a different hut correlated quantity, verify that said measured evaporation temperature or said different but correlated quantity is higher than a first pre-defined temperature or correlated quantity by comparing said evaporation temperature or correlated quantity and said first pre-defined temperature or correlated quantity, and when said measured evaporation temperature or the correlated quantity is higher than said first pre-defined temperature or correlated quantity then starting said compressor and opening said second valve for a pre-defined time length, and thereafter closing said second valve, measuring the evaporation temperature or different but correlated quantity, checking that said measured evaporation temperature or correlated quantity is not higher than a second pre-defined temperature or correlated quantity, measuring the time length from the start, and subsequently checking whether the condition that the time length passed from said start is higher than said minimum time interval length.

* * * * *